(12) United States Patent
Lin

(10) Patent No.: US 9,516,312 B2
(45) Date of Patent: Dec. 6, 2016

(54) METHOD AND APPARATUS FOR BUILDING MOTION VECTOR LIST FOR MOTION VECTOR PREDICTION

(71) Applicant: Huawei Technologies Co., Ltd., Shenzhen (CN)

(72) Inventor: Yongbing Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 14/311,012

(22) Filed: Jun. 20, 2014

(65) Prior Publication Data

US 2014/0301471 A1 Oct. 9, 2014

Related U.S. Application Data

(63) Continuation of application No. PCT/CN2013/073817, filed on Apr. 7, 2013.

(30) Foreign Application Priority Data

Oct. 8, 2012 (CN) .......................... 2012 1 0377579

(51) Int. Cl.
*H04N 19/51* (2014.01)
*H04N 19/52* (2014.01)
(Continued)

(52) U.S. Cl.
CPC ...... *H04N 19/00684* (2013.01); *H04N 19/436* (2014.11); *H04N 19/463* (2014.11); *H04N 19/52* (2014.11); *H04N 19/105* (2014.11)

(58) Field of Classification Search
CPC ............ H04N 19/00684; H04N 19/105; H04N 19/436; H04N 19/463; H04N 19/52
(Continued)

(56) References Cited

U.S. PATENT DOCUMENTS 6,594,313 B1 * 7/2003 Hazra .................... H04N 7/014
348/E7.013
2008/0107180 A1 * 5/2008 Lee ........................ H04N 19/52
375/240.16
(Continued)

FOREIGN PATENT DOCUMENTS

CA 2765828 A1 12/2010
CN 1885948 A 12/2006
(Continued)

OTHER PUBLICATIONS

Foreign Communication From a Counterpart Application, Korean Application No. 10-2014-7007584, Korean Office Action dated May 15, 2015, 4 pages.
(Continued)

*Primary Examiner* — Shan Elahi
(74) *Attorney, Agent, or Firm* — Conley Rose, P.C.

(57) ABSTRACT

Relating to the field of video coding, a method and an apparatus for building a motion vector list for motion vector prediction, which solve a problem of building motion vector lists of at least two PUs in a same coding unit in a serial manner, and improve the parallel processing capability. The method includes: obtaining spatial neighboring blocks of a current prediction block, where the current prediction block is located inside a current coding unit; determining available neighboring blocks of the current prediction block according to a partition manner of the current coding unit, where the available neighboring blocks are located outside the current coding unit; and obtaining motion vector predictors from the available neighboring blocks in a preset sequence according to motion vector predictors of the available neighboring blocks, and adding the obtained motion vector predictors to the motion vector list.

28 Claims, 5 Drawing Sheets

(51) Int. Cl.
  *H04N 19/463* (2014.01)
  *H04N 19/436* (2014.01)
  *H04N 19/105* (2014.01)
(58) Field of Classification Search
  USPC .................................................. 375/240.16
  See application file for complete search history.

(56) References Cited

U.S. PATENT DOCUMENTS

| | | | |
|---|---|---|---|
| 2009/0003441 A1 | 1/2009 | Sekiguchi et al. | |
| 2010/0080285 A1 | 4/2010 | Lee et al. | |
| 2011/0013697 A1 | 1/2011 | Choi et al. | |
| 2011/0170601 A1 | 7/2011 | Kim et al. | |
| 2011/0176612 A1 | 7/2011 | Tsai et al. | |
| 2011/0194609 A1* | 8/2011 | Rusert | H04N 19/105 375/240.16 |
| 2011/0211642 A1 | 9/2011 | Cho et al. | |
| 2011/0293001 A1* | 12/2011 | Lim | G06K 9/36 375/240.12 |
| 2012/0008688 A1* | 1/2012 | Tsai | H04N 19/52 375/240.16 |
| 2012/0106622 A1* | 5/2012 | Huang | H04N 19/129 375/240.01 |
| 2012/0128073 A1 | 5/2012 | Asaka et al. | |
| 2012/0163466 A1 | 6/2012 | Sugio et al. | |
| 2012/0195368 A1* | 8/2012 | Chien | H04N 19/52 375/240.02 |
| 2012/0195379 A1* | 8/2012 | Alshin | H04N 19/105 375/240.12 |
| 2012/0236934 A1 | 9/2012 | Chen et al. | |
| 2012/0257678 A1* | 10/2012 | Zhou | H04N 19/436 375/240.16 |
| 2012/0269270 A1* | 10/2012 | Chen | H04N 19/597 375/240.16 |
| 2012/0269271 A1* | 10/2012 | Chen | H04N 19/597 375/240.16 |
| 2012/0320969 A1* | 12/2012 | Zheng | H04N 19/52 375/240.02 |
| 2013/0003847 A1* | 1/2013 | Hong | H04N 19/52 375/240.16 |
| 2013/0003851 A1* | 1/2013 | Yu | H04N 19/105 375/240.16 |
| 2013/0016788 A1 | 1/2013 | Oh | |
| 2013/0022119 A1* | 1/2013 | Chien | H04N 19/159 375/240.16 |
| 2013/0022122 A1 | 1/2013 | Oh | |
| 2013/0022125 A1* | 1/2013 | Sato | H04N 19/52 375/240.16 |
| 2013/0070854 A1 | 3/2013 | Wang et al. | |
| 2013/0077691 A1* | 3/2013 | Zheng | H04N 19/105 375/240.16 |
| 2013/0188716 A1* | 7/2013 | Seregin | H04N 19/56 375/240.16 |
| 2013/0195189 A1* | 8/2013 | Seregin | H04N 19/00587 375/240.16 |
| 2013/0243081 A1* | 9/2013 | Chen | H04N 19/597 375/240.02 |
| 2014/0092981 A1 | 4/2014 | Lin et al. | |
| 2014/0153647 A1* | 6/2014 | Nakamura | H04N 19/52 375/240.14 |
| 2014/0247878 A1* | 9/2014 | Xu | H04N 19/52 375/240.16 |
| 2014/0301461 A1 | 10/2014 | Jeon et al. | |

FOREIGN PATENT DOCUMENTS

| | | | |
|---|---|---|---|
| CN | 101072356 A | 11/2007 | |
| CN | 101573985 A | 11/2009 | |
| CN | 102215392 A | 10/2011 | |
| CN | 102685477 A | 9/2012 | |
| CN | 102883163 A | 1/2013 | |
| EP | 1513349 A2 | 3/2005 | |
| KR | 20120016991 A | 2/2012 | |
| KR | 20120066593 A | 6/2012 | |
| RU | 2010102711 A | 8/2011 | |
| WO | 2010056013 A2 | 5/2010 | |
| WO | 2012034690 A1 | 3/2012 | |
| WO | 2012071871 A1 | 6/2012 | |
| WO | 2012122786 A1 | 9/2012 | |
| WO | 2013067938 A1 | 5/2013 | |

OTHER PUBLICATIONS

Foreign Communication From a Counterpart Application, Korean Application No. 10-2014-7007584, English Translation of Korean Office Action dated May 15, 2015, 3 pages.
Helle, P., et al., "Block Merging for Quadtree-Based Partitioning in HEVC," IEEE Transactions on Circuits and Systems for Video Technology, vol. 22, No. 12, Dec. 2012, pp. 1720-1731.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
Bici, O., et al., "Non-CE13: Simplification of merge mode," Joint Collaborative Team on Video Coding (JCT-VC) of ITU-T SG16 WP3 and ISO/IEC JTC1/SC29/WG11, JCTVC-G593, Nov. 21-30, 2011, 12 pages.
Foreign Communication From a Counterpart Application, European Application No. 13836185.2, Extended European Search Report dated Aug. 19, 2015, 8 pages.
Foreign Communication From a Counterpart Application, Singapore Application No. 201210377579.4, Letter Deadline to respond to Written Opinion, Jan. 25, 2016, 3 pages.
Foreign Communication From a Counterpart Application, Singapore Application No. 11201400427V, Search Report dated Jan. 11, 2016, 3 pages.
Foreign Communication From a Counterpart Application, Singapore Application No. 11201400427V, Written Opinion dated Jan. 11, 2016, 5 pages.
Kim, L., et al., "High Efficiency Video Coding (HEVC) Test Model 7 (HM 7) Encoder Description," Joint Collaborative Team on Video Coding (JCT-VC) of ITU-T SG16 WP3 and ISO/IEC JTC1/SC29/WG11, JCTVC-I1002, Retrieved from URL: http://phenix.it-sudparis.eu/jct/doc_end_user/documents/9_Geneva/wg11/JCTVC-I1002.v1.zip, Jul. 28, 2012, 7 pages.
Bross, B., et al., "High Efficiency Video Coding (HEVC) text specification draft 8," Joint Collaborative Team on Video Coding (JCT-VC) of ITU-T SG16 WP3 and ISO/IEC JTC1/SC29/WG11 JCTVC-J1003_d7, Retrieved from URL: http://phenix.it-sudparis.eu/jct/doc_end_user/documents/10_Stockholm/wg11/JCTVC-J1003-v8.zip, Jul. 28, 2012, 9 pages.
Foreign Communication From a Counterpart Application, Japanese Application No. 2014-540313, Japanese Office Action dated Jan. 13, 2015, 3 pages.
Foreign Communication From a Counterpart Application, Japanese Application No. 2014-540313, English Translation of Japanese Office Action dated Jan. 13, 2015, 3 pages.
Foreign Communication From a Counterpart Application, Australian Application No. 2013314174, Australian Office Action dated Nov. 20, 2014, 4 pages.
Foreign Communication From a Counterpart Application, Chinese Application No. 201210377579.4, Chinese Search Report dated Oct. 15, 2013, 7 pages.
Foreign Communication From a Counterpart Application, PCT Application No. PCT/CN2013/073817, English Translation of International Search Report dated Jul. 18, 2013, 2 pages.
Foreign Communication From a Counterpart Application, PCT Application No. PCT/CN2013/073817, Written Opinion dated Jul. 18, 2013, 2 pages.
Foreign Communication From a Counterpart Application, Chinese Application No. 201210377579.4, Chinese Office Action dated Dec. 3, 2013, 3 pages.
Foreign Communication From a Counterpart Application, Chinese Application No. 201210377579.4, English Translation of Chinese Office Action dated Dec. 3, 2013, 6 pages.

(56) References Cited

OTHER PUBLICATIONS

Foreign Communication From a Counterpart Application, Chinese Application No. 201210377579.4, Chinese Notice of Allowance dated Feb. 24, 2014, 4 pages.
Foreign Communication From a Counterpart Application, Chinese Application No. 201210377579.4, English Translation of Chinese Notice of Allowance dated Feb. 24, 2014, 7 pages.
Foreign Communication From a Counterpart Application, Russian Application No. EDP141149RU, Russian Accompanying Letter dated Apr. 2, 2015, 1 page.
Foreign Communication From a Counterpart Application, Russian Application No. 2014117043/08, Russian Notice of Allowance dated Jan. 13, 2015, 13 pages.
Foreign Communication From a Counterpart Application, Russian Application No. 2014117043/08, English Translation of Russian Notice of Allowance dated Jan. 13, 2015, 9 pages.
Zhou, M., "Parallelized merge/skip mode for HEVC," Joint Collaborative Team on Video Coding (JCT-VC) of ITU-T SG16 WP3 and ISO/IEC JTC1/SC29/WG11, JCTVC-F069, M20481, Jul. 14-22, 2011, 13 pages.
Wen, X., et al., "Parallel Merge/skip Mode for HEVC," Joint Collaborative Team on Video Coding (JCT-VC) of ITU-T SG16 WP3 and ISO/IEC JTC1/SC29/WG11, JCTVC-H387, Nov. 21-30, 2011, 13 pages.
Bici, O., et al., "Non-CE13: Simplification of merge mode," Joint Collaborative Team on Video Coding (JCT-VC) of ITU-T SG16 WP3 and ISO/IEC JTC1/SC29/WG11, JCTVC-G593, Nov. 21-30, 2011, 13 pages.
Zheng, Y., et al., "Non-CE9: Simplified Merge candidate derivation," Joint Collaborative Team on Video Coding (JCT-VC) of ITU-T SG16 WP3 and ISO/IEC JTC1/SC29/WG11, JCTVC-G681, Nov. 21-30, 2011, 5 pages.
Jeon, Y., et al., "Parallel Merge Candidate Derivation for Inter_NxN partition type," Joint Collaborative Team on Video Coding (JCT-VC) of ITU-T SG16 WP3 and ISO/IEC JTC1/SC29/WG11, JCTVC-H0091, Feb. 1-10, 2012, 4 pages.
Lin, J., et al., "Parallel NxN merge mode," Joint Collaborative Team on Video Coding (JCT-VC) of ITU-T SG16 WP3 and ISO/IEC JTC1/SC29/WG11, JCTVC-I0180, Apr. 27-May 7, 2012, 4 pages.
Lin, Y., et al., "Removal of dependency between multiple PUs in a CU for parallel merging candidated list construction," Joint Collaborative Team on Video Coding (JCT-VC) of ITU-T SG16 WP3 and ISO/IEC JTC1/SC29/WG11, JCTVC-K0197, Oct. 10-19, 2012, 5 pages.
Foreign Communication From a Counterpart Application, Japanese Application No. 2014-540313, Japanese Office Action dated Feb. 23, 2016, 6 pages.
Foreign Communication From a Counterpart Application, Japanese Application No. 2014-540313, English Translation of Japanese Office Action dated Feb. 23, 2016, 7 pages.
Tok, M., et al., "Parametric Motion Vector Prediction for Hybrid Video Coding," Picture Coding Symposium, May 7-9, 2012, pp. 381-384.
Zhou, M., et al.,"Scalable motion vector competition and simplified MVP calculation," Joint Collaborative Team on Video Coding (JCT-VC) of ITU-T SG16 WP3 and ISO/IEC JTC1/SC29/WG11, JCTVC-D055, m18802, Jan. 20-28, 2011, 9 pages.
Kim, H., et al., "CU-based Merge Candidate List Construction," Joint Collaborative Team on Video Coding (JCT-VC) of ITU-T SG16 WP3 and ISO/IEC JTC1/SC29/WG11, JCTVC-G416, Nov. 21-30, 2011, 15 pages.
Foreign Communication From a Counterpart Application, Japanese Application No. 2014-540313, Japanese Office Action dated Jul. 5, 2016, 6 pages.
Foreign Communication From a Counterpart Application, Japanese Application No. 2014-540313, English Translation of Japanese Office Action dated Jul. 5, 2016, 7 pages.
Foreign Communication From A Counterpart Application, Chinese Application No. 201410091553.2, Chinese Office fiction dated Aug. 1, 2016, 3 pages.
Foreign Communication From A Counterpart Application, Chinese Application No. 201410091553.2, Chinese Search Report dated Jul. 22, 2016, 2 pages.
Foreign Communication From A Counterpart Application, Chinese Application No. 201410091554.7, Chinese Office Action dated Sep. 5, 2016, 3 pages.
Foreign Communication From A Counterpart Application, Chinese Application No. 201410091554.7, Chinese Search Report dated Aug. 15, 2016, 2 pages.

* cited by examiner

METHOD AND APPARATUS FOR BUILDING MOTION VECTOR LIST FOR MOTION VECTOR PREDICTION

CROSS-REFERENCE TO RELATED APPLICATION

This application is a continuation of International Application No. PCT/CN2013/073817, filed on Apr. 7, 2013, which claims priority to Chinese Patent Application No. 201210377579.4, filed on Oct. 8, 2012, both of which are incorporated herein by reference in their entireties.

TECHNICAL FIELD

The present invention relates to the field of video coding, and in particular, to a method and an apparatus for building a motion vector list for motion vector prediction.

BACKGROUND

An interframe prediction technology in the High Efficiency Video Coding (HEVC) adopts a conventional Motion Compensated Prediction (MCP) method. For motion vector prediction, the HEVC adopts a multiple motion vectors competition method, which improves the accuracy of motion vector prediction, thereby improving the coding compression performance.

The HEVC interframe prediction mode may include, but is not limited to, a Merge mode, a Skip mode, and so on, all of which use the multiple motion vectors competition to perform interframe prediction. A motion vector list is used when motion vector prediction is performed. For the Merge mode and the Skip mode, the motion vector list is allowed to contain at most four spatial motion vector predictors and one temporal motion vector predictor, where the Merge mode and the Skip mode share one motion vector list. A coder selects a best motion vector predictor from the motion vector list as a motion vector predictor of a current Prediction Unit (PU), which may be called a prediction block hereinafter.

A method for building the motion vector list may include:

As shown in FIG. 1, spatial neighboring blocks of the current PU may include: a neighboring block A0 (a bottom-left reference block corresponding to a bottom-left corner position of the current PU), a neighboring block A1 (a left reference block corresponding to the bottom-left corner position of the current PU), a neighboring block B0 (a top-right reference block corresponding to a top-right corner position of the current PU), a neighboring block B1 (a top reference block corresponding to the top-right corner position of the current PU), and a neighboring block B2 (a top-left reference block corresponding to a top-left position of the current PU). A Temporal Motion Vector predictor (TMVP) is a motion vector predictor corresponding to the current PU in time domain.

Firstly, motion vector predictors are successively obtained from the neighboring blocks and the TMVP in a sequence of the neighboring block A1, the neighboring block B1, the neighboring block B0, the neighboring block A0, the neighboring block B2, and the TMVP. Then, the obtained motion vector predictors are added to the motion vector list according to a rule in the HEVC. The specific motion vector list building process is a technology well known by a person skilled in the art, so that details will not be described herein again.

Further, a current Coding Unit (CU), which may be called a coding unit hereinafter, may include at least two PUs, and motion vector lists of the at least two PUs are built in a serial manner.

During the implementation of the above motion vector list building process, it is found that the prior art has at least the following problem: if the current CU includes at least two PUs, and the motion vector lists of the at least two PUs are built in a serial manner, the speed of building the motion vector lists of the at least two PUs in the same CU is slow, thereby reducing the parallel processing capability.

SUMMARY

Embodiments of the present invention provide a method and an apparatus for building a motion vector list for motion vector prediction, which solve the problem of building motion vector lists of at least two PUs in a same coding unit in a serial manner, and improve the parallel processing capability.

In order to achieve the above objective, the following technical solutions are adopted in the embodiments of the present invention.

In one aspect, a method for building a motion vector list for motion vector prediction is provided, which includes: obtaining spatial neighboring blocks of a current prediction block, where the current prediction block is located inside a current coding unit; determining available neighboring blocks of the current prediction block according to a partition manner of the current coding unit, where the available neighboring blocks are located outside the current coding unit; and obtaining motion vector predictors from the available neighboring blocks in a preset sequence according to motion vector predictors of the available neighboring blocks, and adding the obtained motion vector predictors to the motion vector list.

In another aspect, an apparatus for building a motion vector list for motion vector prediction is provided, which includes: a receiver configured to obtain spatial neighboring blocks of a current prediction block, where the current prediction block is located inside a current coding unit; and a processor configured to determine available neighboring blocks of the current prediction block according to a partition manner of the current coding unit, where the available neighboring blocks are located outside the current coding unit; and obtain motion vector predictors from the available neighboring blocks in a preset sequence according to motion vector predictors of the available neighboring blocks, and add the obtained motion vector predictors to the motion vector list.

In the method and apparatus for building a motion vector list for motion vector prediction provided in the embodiments of the present invention, through the above solutions, when a motion vector list of a prediction block is built, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vector predictors are obtained from the available neighboring blocks in a preset sequence according to motion vector predictors of the available neighboring blocks, and the obtained motion vector predictors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the prior art, a CU may include at least two PUs, and motion vector lists of the at least two PUs are built in a serial manner. That is, after the motion vector list is built for a current PU, a motion vector list starts to be built for the next PU.

The specific process may include:

As shown in FIG. 2A to FIG. 2G, a CU (solid line frame in figures) may be further partitioned into multiple PUs. In the HEVC, the CU may have seven partition manners. For example, in the partition manners shown in FIG. 2A to FIG. 2C, a current CU is partitioned into two PUs (PU1 and PU2) on left and right sides. For another example, in the partition manner shown in FIG. 2D, the current CU is partitioned into four PUs (PU1, PU2, PU3, and PU4), and other types are not described herein.

Figure 2A:
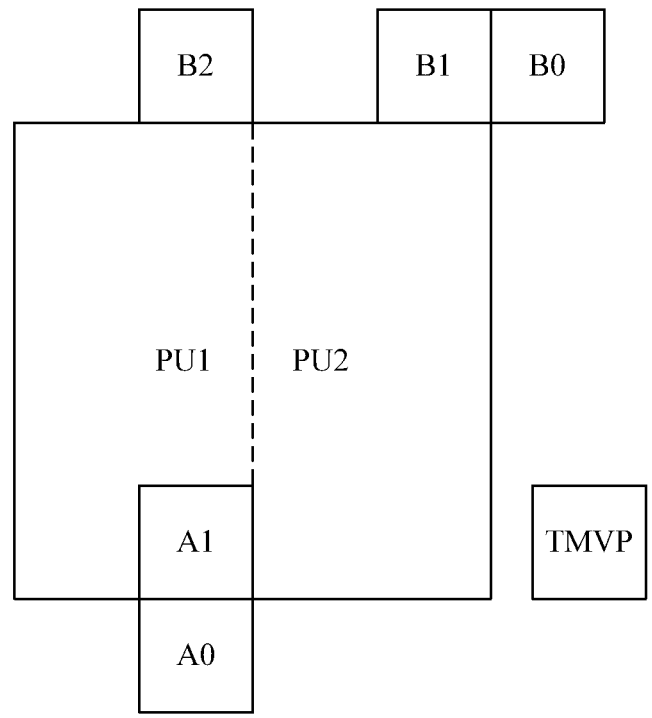
FIG. 2A to FIG. 2G are schematic structural diagrams of a coding unit CU with different partition manners according to an embodiment.

Taking the partition shown in FIG. 2A as an example, since a spatial reference block A1 of the PU2 is located inside the PU1, a motion vector list of the PU2 can start to be built only after PU1 coding is finished, where the motion vector lists of the PU1 and the PU2 are built in a serial manner. Specifically, the motion vector list of the PU1 is firstly built according to the above method, and then the motion vector list of the PU2 is built according to the above method.

In this way, the speed of building the motion vector lists of at least two PUs is slow, and the compression coding performance is degraded.

Figure 3:
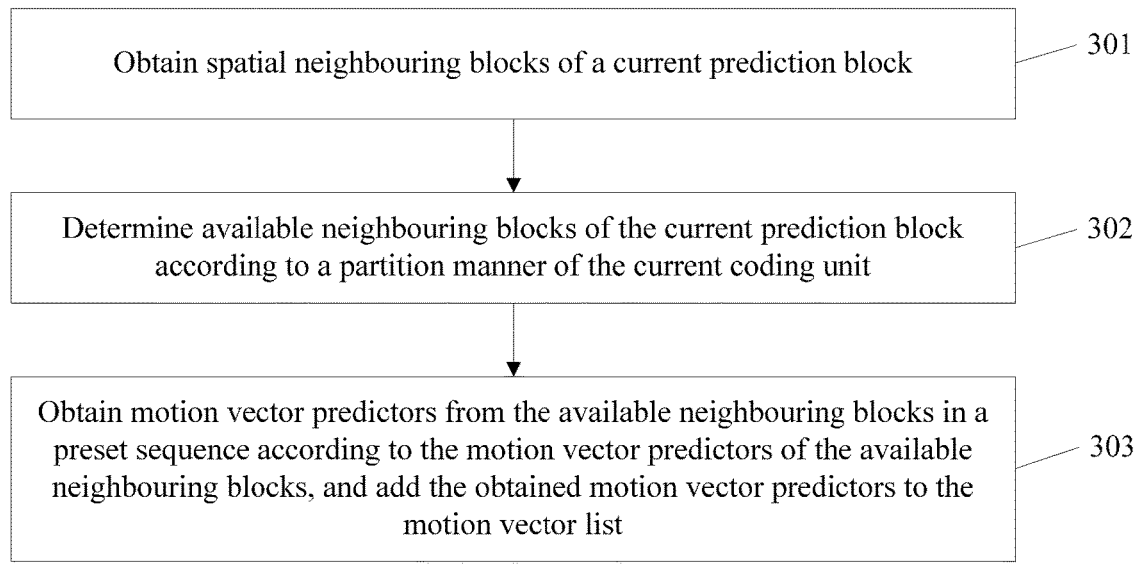
FIG. 3 is a flowchart of a method for building a motion vector list for motion vector prediction according to an embodiment.

In order to solve the above problem that the speed of building the motion vector lists of at least two PUs is slow and the compression coding performance is degraded, a method for building a motion vector list for motion vector prediction is provided in an embodiment. As shown in FIG. 3, the method may include:

301: Obtain spatial neighboring blocks of a current prediction block, where the current prediction block is located inside a current coding unit.

302: Determine available neighboring blocks of the current prediction block according to a partition manner of the current coding unit, where the available neighboring blocks are located outside the current coding unit.

303: Obtain motion vector predictors from the available neighboring blocks in a preset sequence according to motion vector predictors of the available neighboring blocks, and add the obtained motion vector predictors to the motion vector list.

Through the above solution, when building a motion vector list of a prediction block, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vector predictors are obtained from the available neighboring blocks in a preset sequence according to motion vector predictors of the available neighboring blocks, and the obtained motion vector predictors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Another method for building a motion vector list for motion vector prediction is provided in an embodiment, and the method is further an extension of the method shown in FIG. 3. As shown in FIG. 3, the method may include:

301: Obtain spatial neighboring blocks of a current prediction block, where the current prediction block is located inside a current coding unit.

Figure 1:
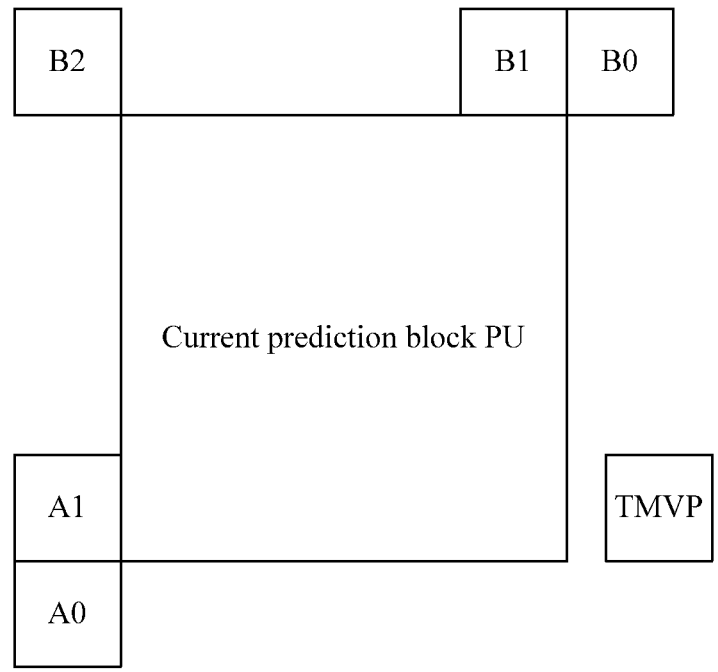
FIG. 1 is a schematic structural diagram of a coding unit CU, a PU, and neighboring blocks according to an embodiment.

As shown in FIG. 1, the spatial neighboring blocks of the prediction block may include: a neighboring block A0 located at a bottom-left side of the prediction block, a neighboring block A1 located at a left side of the prediction block, a neighboring block B0 at a top-right side of the prediction block, a neighboring block B1 at a top side of the prediction block, and a neighboring block B2 at a top-left side of the prediction block.

A method for obtaining the spatial neighboring blocks of the prediction block, the prediction block, and the neighboring blocks is not limited in this embodiment, and is a technology well known by a person skilled in the art, so that details will not be described herein again.

302: Determine available neighboring blocks of the current prediction block according to a partition manner of the current coding unit, where the available neighboring blocks are located outside the current coding unit.

Figure 2B:
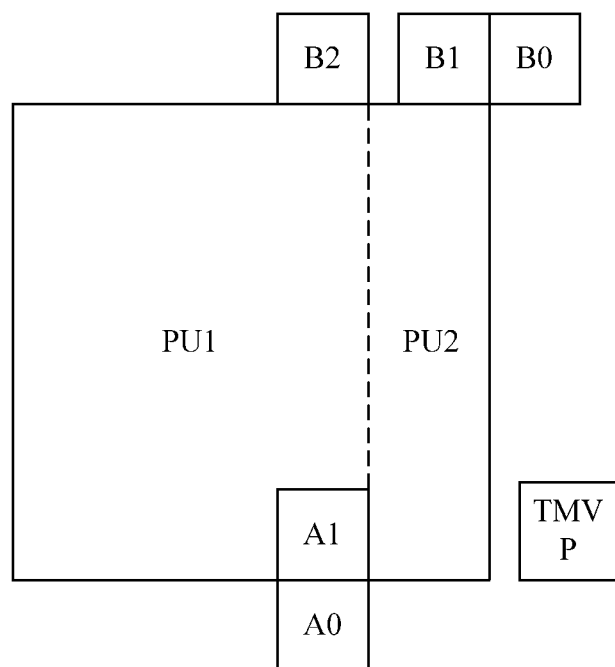
Figure 2C:
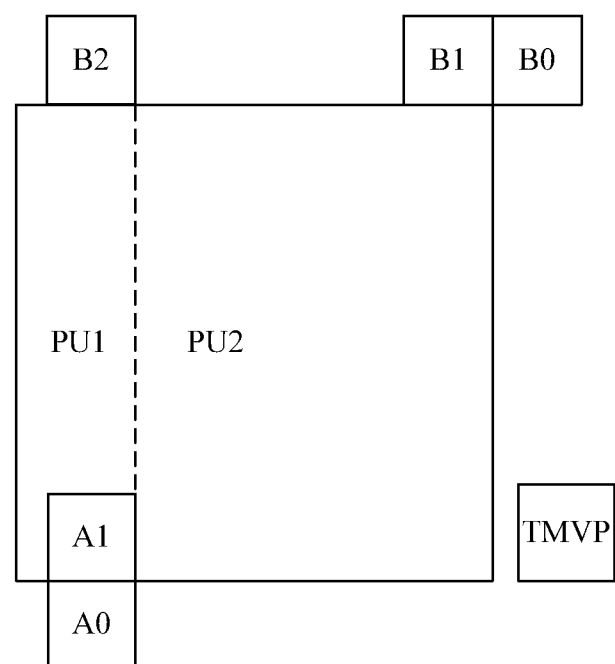
Figure 2D:
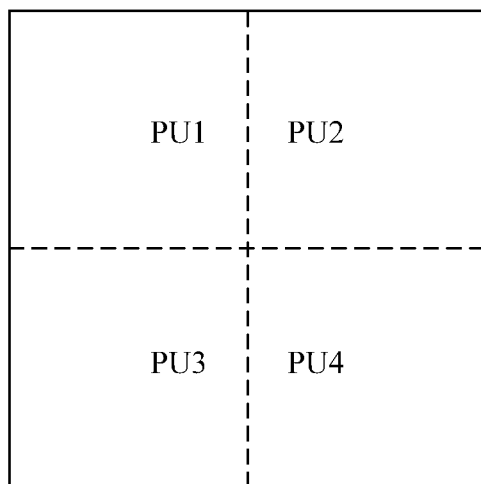
Figure 2E:
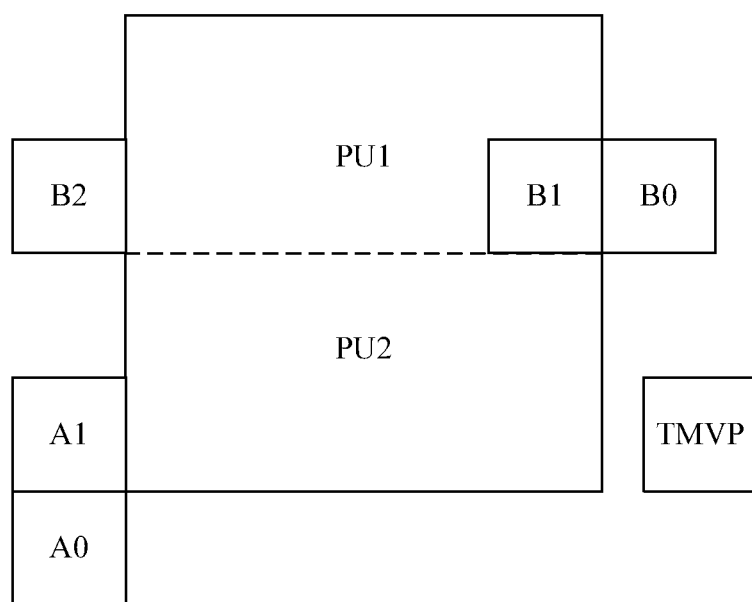
Figure 2F:
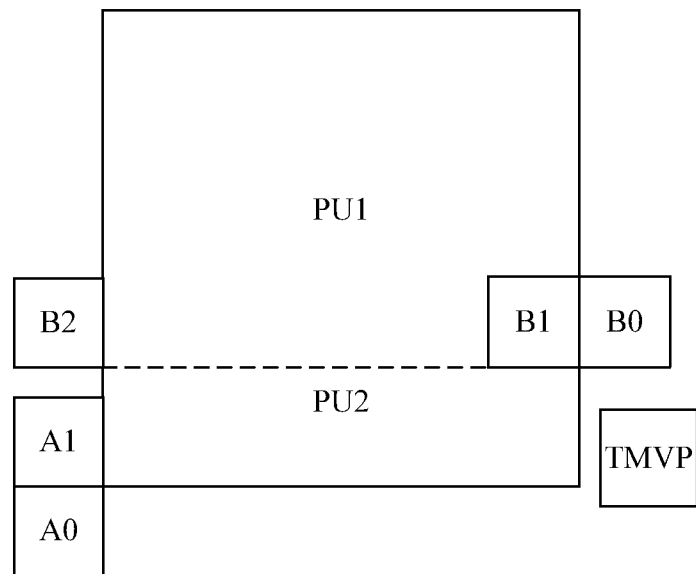
Figure 2G:
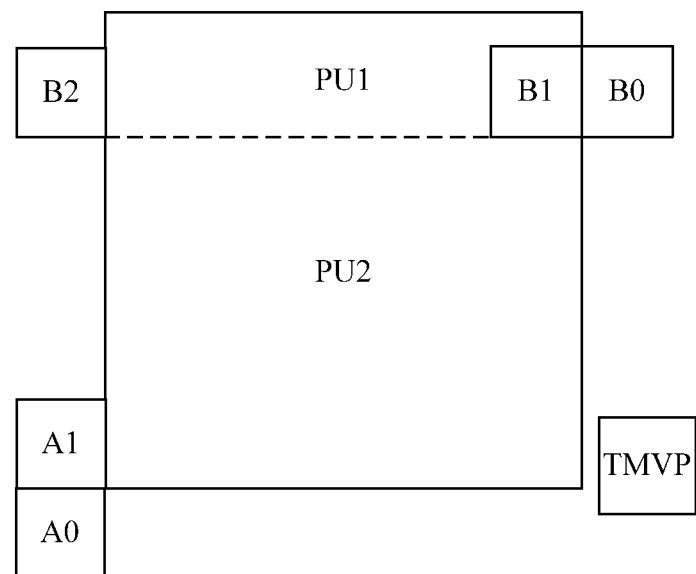

Further, as shown in FIG. 2E to FIG. 2G, if the current coding unit CU is partitioned into a first prediction block PU1 and a second prediction block PU2 on top and bottom sides, and the current prediction block is the second prediction block PU2, the available neighboring blocks of the PU2 include: the neighboring block A0, the neighboring block A1, the neighboring block B0, and the neighboring block B2 of the second prediction block. At this time, the neighboring block B1 is located inside the current coding unit CU, and does not act as the available neighboring block of the second prediction block PU2.

As shown in FIG. 2A to FIG. 2C, if the current coding unit CU is partitioned into a first prediction block PU1 and a second prediction block PU2 on left and right sides, and the current prediction block is the second prediction block PU2, the available neighboring blocks of the PU2 include: neighboring block A0, neighboring block B0, neighboring block B1, and neighboring block B2 of the second prediction block PU2. At this time, the neighboring block A1 is located inside the current coding unit CU, and does not act as the available neighboring block of the second prediction block PU2.

Further, the available neighboring blocks may be determined by using flag bits of the neighboring blocks. The flag bits may, but are not limited to, be used to identify that the neighboring blocks are not located inside the CU.

A method for determining the available neighboring blocks by using the flag bit(s) of the neighboring blocks is not limited in this embodiment, and is a technology well known by a person skilled in the art, so that details will not be described herein again.

303: Obtain motion vector predictors from the available neighboring blocks in a preset sequence according to motion vector predictors of the available neighboring blocks, and add the obtained motion vector predictors to the motion vector list.

Further, the obtaining motion vector predictors from the available neighboring blocks in a preset sequence may include, if the available neighboring blocks are interframe coding blocks, obtaining the motion vector predictors from the available neighboring blocks in a sequence of the neighboring block A1, the neighboring block B1, the neighboring block B0, the neighboring block A0, and the neighboring block B2.

Specifically, if the available neighboring blocks are interframe coding blocks, it indicates that the neighboring blocks include motion vector information, and the motion vector predictors are obtained from the neighboring blocks.

Specifically, if the available neighboring blocks of the prediction block include the neighboring block A0, the neighboring block A1, the neighboring block B0, and the neighboring block B2 of the second prediction block, the motion vector predictors are obtained from the neighboring block A0, the neighboring block A1, the neighboring block B0, and the neighboring block B2 in a sequence of the neighboring block A0, the neighboring block A1, the neighboring block B0, and the neighboring block B2. In view of the above, when the current CU is partitioned into the first and the second prediction blocks on top and bottom sides, the available neighboring blocks of the second prediction block do not include the neighboring block B1 located inside the first prediction block. Therefore, the motion vector predictor from B1 is not obtained.

If the available neighboring blocks of the prediction block include: the neighboring block A0, the neighboring block B0, the neighboring block B1, and the neighboring block B2 of the second prediction block PU2, the motion vector predictors are obtained from the neighboring block A0, the neighboring block B0, the neighboring block B1, and the neighboring block B2 in a sequence of the neighboring block A0, the neighboring block B0, the neighboring block B1, and the neighboring block B2. In view of the above, when the current CU is partitioned into the first and the second prediction blocks on left and right sides, the available neighboring blocks of the second prediction block do not include the neighboring block A1 located inside the first prediction block. Therefore, the motion vector predictor from the A1 is not obtained.

Further, if the obtained motion vector predictor is a motion vector predictor of a current available neighboring block, the adding the obtained motion vector predictors to the motion vector list includes determining whether the motion vector predictor of the current available neighboring block is the same as motion vector predictors of other available neighboring blocks except the current available neighboring block; and if not, adding the motion vector predictor of the current available neighboring block to the motion vector list.

In view of the above, during the above process, since the available neighboring blocks do not include the neighboring block located inside the current CU, multiple PUs of the CU have no dependency, and may be executed in parallel. For example, when the current CU is partitioned into the first and the second prediction blocks on left and right sides, the available neighboring blocks of the second prediction block do not include the neighboring block A1 located inside the first prediction block, and the motion vector predictor of the A1 is not involved in the determination process. Therefore, the second prediction block and the first prediction block may execute the process in parallel.

Specifically, as an implementation manner of the embodiment, if the current available neighboring block is the neighboring block B1, it is determined whether a motion vector predictor of the neighboring block B1 is the same as a motion vector predictor of the neighboring block A1; if the current available neighboring block is the neighboring block B0, it is determined whether a motion vector predictor of the neighboring block B0 is the same as the motion vector predictor of the neighboring block B1; if the current available neighboring block is the neighboring block A0, it is determined whether a motion vector predictor of the neighboring block A0 is the same as the motion vector predictor of the neighboring block A1; and if the current available neighboring block is the neighboring block B2, it is determined whether a motion vector predictor of the neighboring block B2 is the same as at least one of the motion vector predictor of the neighboring block A1 and the motion vector predictor of the neighboring block B1.

Further, if the obtained motion vector predictor is a motion vector predictor of a current available neighboring block, the adding the obtained motion vector predictors to the motion vector list may further include determining whether the motion vector predictor of the current available neighboring block is the same as motion vector predictors that have been added to the motion vector list; and if not, adding the motion vector predictor of the current available neighboring block to the motion vector list.

Specifically, as an implementation manner of the embodiment, if the current available neighboring block is the neighboring block B1, it is determined whether the motion vector predictor of the neighboring block B1 is the same as the motion vector predictor, of the neighboring block A1 that has been added to the motion vector list; if the current available neighboring block is the neighboring block B0, it is determined whether the motion vector predictor of the neighboring block B0 is the same as the motion vector predictor, of the neighboring block B1 that has been added to the motion vector list; if the current available neighboring block is the neighboring block A0, it is determined whether the motion vector predictor of the neighboring block A0 is the same as the motion vector predictor, of the neighboring block A1 that has been added to the motion vector list; and if the current available neighboring block is the neighboring block B2, it is determined whether the motion vector predictor of the neighboring block B2 is the same as at least one of the motion vector predictor, of the neighboring block A1 that has been added to the motion vector list and the motion vector predictor, of the neighboring block B1 that has been added to the motion vector list.

Further, a TMVP may further be considered during the build-up of the motion vector list.

As an implementation manner of the embodiment, the obtaining motion vector predictors from the available neighboring blocks in a preset sequence may further be obtaining motion vector predictors from the available neighboring blocks and/or the TMVP in a sequence of the neighboring block A1, the neighboring block B1, the neighboring block B0, the neighboring block A0, the neighboring block B2, and the TMVP.

In order to describe the solution of the present invention more clearly, the method for building the motion vector list for the CU with different partition manners are specifically described below.

1. The CU is Partitioned into a PU1 and a PU2 on Left and Right Sides (1) Build a Motion Vector List of the PU1

1) Obtain motion vector predictors from the neighboring block A1, the neighboring block B1, the neighboring block B0, the neighboring block A0, and the neighboring block B2 in a sequence of the neighboring block A1, the neighboring block B1, the neighboring block B0, the neighboring block A0, and the neighboring block B2, and add them to the motion vector list.

a. When the current neighboring block is the neighboring block A1, and only when the neighboring block A1 includes a motion vector predictor, add the motion vector predictor of the neighboring block A1 to the motion vector list; b. when the current neighboring block is the neighboring block B1, and only when the neighboring block B1 includes a motion vector predictor, and the predictor is different from the motion vector predictor, of the neighboring block A1 that has been added to the motion vector list, add the motion vector predictor of the neighboring block B1 to the motion vector list; c. when the current neighboring block is the neighboring block B0, and only when the neighboring block B0 includes a motion vector predictor, and the predictor is different from the motion vector predictor, of the neighboring block B1 that has been added to the motion vector list, add the motion vector predictor of the neighboring block B0 to the motion vector list; d. when the current neighboring block is the neighboring block A0, and only when the neighboring block A0 includes a motion vector predictor, and the predictor is different from the motion vector predictor, of the neighboring block A1 that has been added to the motion vector list, add the motion vector predictor of the neighboring block A0 to the motion vector list; and e. when the current neighboring block is the neighboring block B2, and only when the neighboring block B2 includes a motion vector predictor, the predictor is different from both the motion vector predictor, of the neighboring block A1 that has been added to the motion vector list, and the motion vector predictor, of the neighboring block B1 that has been added to the motion vector list, and the motion vector predictor of at least one of the neighboring block A1, the neighboring block B1, the neighboring block B0, and the neighboring block A0 has not been added to the motion vector list, add the motion vector predictor of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

(2) Build a Motion Vector List of the PU2

1) Obtain motion vector predictors from the neighboring block B1, the neighboring block B0, the neighboring block A0, and the neighboring block B2 in a sequence of the neighboring block B1, the neighboring block B0, the neighboring block A0, and the neighboring block B2, and add them to the motion vector list.

a. When the current neighboring block is the neighboring block B1, and only when the neighboring block B1 includes a motion vector predictor, add the motion vector predictor of the neighboring block B1 to the motion vector list; b. when the current neighboring block is the neighboring block B0, and only when the neighboring block B0 includes a motion vector predictor, and the prediction value is different from the motion vector predictor, of the neighboring block B1 that has been added to the motion vector list, add the motion vector predictor of the neighboring block B0 to the motion vector list; c. when the current neighboring block is the neighboring block A0, and only when the neighboring block A0 includes a motion vector predictor, add the motion vector predictor of the neighboring block A0 to the motion vector list; and d. when the current neighboring block is the neighboring block B2, and only when the neighboring block B2 includes a motion vector predictor, and the predictor is different from the motion vector predictor, of the neighboring block B1 that has been added to the motion vector list, add the motion vector predictor of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

At this time, since when the motion vector list of the PU2 is built, the neighboring block A1 of the PU2 is not considered, the motion vector lists of the PU1 and the PU2 may be built in a parallel manner.

2. The CU is Partitioned into a PU1 and a PU2 on Top and Bottom Sides (1) Build a Motion Vector List of the PU1

This is similar to the method of "(1) Build a motion vector list of the PU1" in "1. The CU is partitioned into a PU1 and a PU2 on left and right sides", so the details will not be described herein again.

(2) Build a Motion Vector List of the PU2

1) Obtain motion vector predictors from the neighboring block B1, the neighboring block B0, the neighboring block A0, and the neighboring block B2 in a sequence of the neighboring block B1, the neighboring block B0, the neighboring block A0, and the neighboring block B2, and add them to the motion vector list.

a. When the current neighboring block is the neighboring block A1, and only when the neighboring block A1 includes a motion vector predictor, add the motion vector predictor of the neighboring block A1 to the motion vector list; b. when the current neighboring block is the neighboring block B0, and only when the neighboring block B0 includes a motion vector predictor, add the motion vector predictor of the neighboring block B0 to the motion vector list; c. when the current neighboring block is the neighboring block A0, and only when the neighboring block A0 includes a motion vector predictor, and the predictor is different from the motion vector predictor, of the neighboring block A1 that has been added to the motion vector list, add the motion vector predictor of the neighboring block A0 to the motion vector list; and d. when the current neighboring block is the neighboring block B2, and only when the neighboring block B2 includes a motion vector predictor, and the predictor is different from the motion vector predictor, of the neighboring block A1 that has been added to the motion vector list, add the motion vector predictor of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

At this time, since when the motion vector list of the PU2 is built, the neighboring block B1 of the PU2 is not considered, the motion vector lists of the PU1 and the PU2 may be built in a parallel manner.

Through the above solution, when a motion vector list of a prediction block is built, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vector predictors are obtained from the available neighboring blocks in a preset sequence according to motion vector predictors of the available neighboring blocks, and the obtained motion vector predictors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Some apparatus embodiments are provided below, and the provided apparatus embodiments respectively correspond to the above method embodiments. Refer to the method embodiments for specific implementation manners of the apparatus and a receiver and a processor included in the apparatus.

Figure 4:
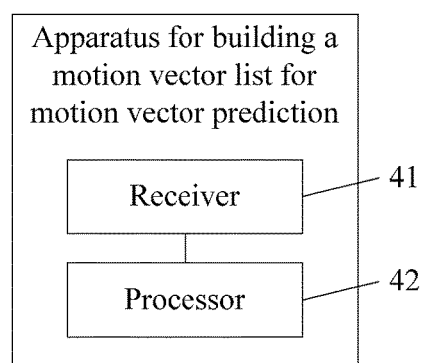
FIG. 4 is a schematic structural diagram of an apparatus for building a motion vector list for motion vector prediction according to an embodiment.

An apparatus for building a motion vector list for motion vector prediction is provided in an embodiment. As shown in FIG. 4, the apparatus may include: a receiver 41 configured to obtain spatial neighboring blocks of a current prediction block, where the current prediction block is located inside a current coding unit; and a processor 42 configured to determine available neighboring blocks of the current prediction block according to a partition manner of the current coding unit, where the available neighboring blocks are located outside the current coding unit; and obtain motion vector predictors from the available neighboring blocks in a preset sequence according to motion vector predictors of the available neighboring blocks, and add the obtained motion vector predictors to the motion vector list.

Further, the spatial neighboring blocks of the prediction block obtained by the receiver 41 include a neighboring block A0 located at a bottom-left side of the prediction block, a neighboring block A1 located at a left side of the prediction block, a neighboring block B0 at a top-right side of the prediction block, a neighboring block B1 at a top side of the prediction block, and a neighboring block B2 at a top-left side of the prediction block.

Further, the processor 42 is further configured to, if the current coding unit is partitioned into a first prediction block and a second prediction block on top and bottom sides, and the current prediction block is the second prediction block, the available neighboring blocks of the prediction block include the neighboring block A0, the neighboring block A1, the neighboring block B0, and the neighboring block B2 of the second prediction block; and if the current coding unit is partitioned into a first prediction block and a second prediction block on left and right sides, and the current prediction block is the second prediction block, the available neighboring blocks of the prediction block include the neighboring block A0, the neighboring block B0, the neighboring block B1, and the neighboring block B2 of the second prediction block.

The processor 42 is further configured to, if the available neighboring blocks are interframe coding blocks, obtain the motion vector predictors from the available neighboring blocks in a sequence of the neighboring block A1, the neighboring block B1, the neighboring block B0, the neighboring block A0, and the neighboring block B2.

The processor 42 is further configured to determine whether a motion vector predictor of a current available neighboring block is the same as motion vector predictors of other available neighboring blocks except the current available neighboring block; and if not, add the motion vector predictor of the current available neighboring block to the motion vector list.

The processor 42 is further configured to determine whether a motion vector predictor of a current available neighboring block is the same as motion vector predictors that have been added to the motion vector list; and if not, add the motion vector predictor of the current available neighboring block to the motion vector list.

The processor 42 is further configured to, if the current available neighboring block is the neighboring block B1, determine whether a motion vector predictor of the neighboring block B1 is the same as a motion vector predictor of the neighboring block A1; if the current available neighboring block is the neighboring block B0, determine whether a motion vector predictor of the neighboring block B0 is the same as the motion vector predictor of the neighboring block B1; if the current available neighboring block is the neighboring block A0, determine whether a motion vector predictor of the neighboring block A0 is the same as the motion vector predictor of the neighboring block A1; and if the current available neighboring block is the neighboring block B2, determine whether a motion vector predictor of the neighboring block B2 is the same as at least one of the motion vector predictor of the neighboring block A1 and the motion vector predictor of the neighboring block B1.

The processor 42 is further configured to, if the current available neighboring block is the neighboring block B1, determine whether a motion vector predictor of the neighboring block B1 is the same as a motion vector predictor of the neighboring block A1 that has been added to the motion vector list; if the current available neighboring block is the neighboring block B0, determine whether a motion vector predictor of the neighboring block B0 is the same as the motion vector predictor of the neighboring block B1 that has been added to the motion vector list; if the current available neighboring block is the neighboring block A0, determine whether a motion vector predictor of the neighboring block A0 is the same as the motion vector predictor of the neighboring block A1 that has been added to the motion vector list; and if the current available neighboring block is the neighboring block B2, determine whether a motion vector predictor of the neighboring block B2 is the same as at least one of the motion vector predictor of the neighboring block A1 that has been added to the motion vector list and the motion vector predictor of the neighboring block B1 that has been added to the motion vector list.

Through the above solution, when a motion vector list of a prediction block is built, the receiver obtains spatial neighboring blocks of the current prediction block first, where the current prediction block is located inside a current coding unit; and the processor determines available neighboring blocks of the current prediction block according to a partition manner of the current coding unit, where the available neighboring blocks are located outside the current coding unit; and obtains the motion vector predictors from the available neighboring blocks in a preset sequence according to motion vector predictors of the available neighboring blocks, and adds the obtained motion vector predictors to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Through the foregoing description of the embodiments, a person skilled in the art may clearly understand that the present invention may be implemented by software in addition to necessary universal hardware, and definitely may also be implemented by hardware. However, under most circumstances, the former is preferred. Based on such an understanding, the technical solutions of the present invention essentially, or the part contributing to the prior art may be implemented in the form of a software product. The computer software product is stored in a readable storage medium, for example, a floppy disc, a hard disk, or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for building, by a coder, a motion vector list for motion vector prediction, comprising:
   obtaining spatial neighboring blocks of a current prediction block, wherein the current prediction block to be predicated using the motion vector list is located inside a current coding unit;
   determining available neighboring blocks of the current prediction block according to a partition manner of the current coding unit when one of the spatial neighboring blocks of the current prediction block is located inside the current coding unit, wherein the available neighboring blocks are located outside the current coding unit;
   obtaining a plurality of motion vector predictors from the available neighboring blocks in a preset sequence according to the motion vector predictors of the available neighboring blocks; and
   adding the obtained motion vector predictors to the motion vector list while comparing at least a pair of the motion vector predictors of the available neighboring blocks to exclude one of the pair of the motion vector predictors of the available neighboring blocks from the motion vector list when the pair of the motion vector predictors are the same, wherein the at least a pair of motion vector predictors belong to two available neighboring blocks which are located on the same side of the current prediction block.

2. The method for building a motion vector list for motion vector prediction according to claim 1, wherein the spatial neighboring blocks of the prediction block comprise a first neighboring block located at a bottom-left side of the prediction block, a second neighboring block located at a left side of the prediction block, a third neighboring block located at a top-right side of the prediction block, a fourth neighboring block located at a top side of the prediction block, and a fifth neighboring block located at a top-left side of the prediction block.

3. The method for building a motion vector list for motion vector prediction according to claim 2, either wherein the current coding unit is partitioned into a first prediction block and a second prediction block on top and bottom sides, wherein the current prediction block is the second prediction block, and wherein the available neighboring blocks of the prediction block comprise the first neighboring block, the second neighboring block, the third neighboring block, and the fifth neighboring block of the second prediction block, or wherein the current coding unit is partitioned into a first prediction block and a second prediction block on left and right sides, wherein the current prediction block is the second prediction block, and wherein the available neighboring blocks of the prediction block comprise the first neighboring block, the third neighboring block, the fourth neighboring block, and the fifth neighboring block of the second prediction block.

4. The method for building a motion vector list for motion vector prediction according to claim 2, wherein the available neighboring blocks are interframe coding blocks, and wherein obtaining the motion vector predictors from the available neighboring blocks in the preset sequence comprises obtaining the motion vector predictors from the available neighboring blocks in a sequence of the second neighboring block, the fourth neighboring block, the third neighboring block, the first neighboring block, and the fifth neighboring block.

5. The method for building a motion vector list for motion vector prediction according to claim 3, wherein the available neighboring blocks are interframe coding blocks, and wherein obtaining the motion vector predictors from the available neighboring blocks in the preset sequence comprises obtaining the motion vector predictors from the available neighboring blocks in a sequence of the second neighboring block, the fourth neighboring block, the third neighboring block, the first neighboring block, and the fifth neighboring block.

6. The method for building a motion vector list for motion vector prediction according to claim 4, wherein the obtained motion vector predictor is a motion vector predictor of a current available neighboring block, and wherein adding the obtained motion vector predictors to the motion vector list while comparing the at least a pair of the motion vector predictors of the available neighboring blocks to exclude the one of the pair of the motion vector predictors of the available neighboring blocks from the motion vector list when the pair of the motion vector predictors are the same comprises:
  determining whether the motion vector predictor of the current available neighboring block is the same as the motion vector predictors of other available neighboring blocks that are not the current available neighboring block; and
  adding the motion vector predictor of the current available neighboring block to the motion vector list when the motion vector predictor of the current available neighboring block is not the same as motion vector predictors of other available neighboring blocks that are not the current available neighboring block.

7. The method for building a motion vector list for motion vector prediction according to claim 5, wherein the obtained motion vector predictor is a motion vector predictor of a current available neighboring block, and wherein adding the obtained motion vector predictors to the motion vector list while comparing the at least a pair of the motion vector predictors of the available neighboring blocks to exclude the one of the pair of the motion vector predictors of the available neighboring blocks from the motion vector list when the pair of the motion vector predictors are the same comprises:
  determining whether the motion vector predictor of the current available neighboring block is the same as motion vector predictors of other available neighboring blocks that are not the current available neighboring block; and
  adding the motion vector predictor of the current available neighboring block to the motion vector list when the motion vector predictor of the current available neighboring block is not the same as motion vector predictors of other available neighboring blocks that are not the current available neighboring block.

8. The method for building a motion vector list for motion vector prediction according to claim 4, wherein the obtained motion on vector predictor is a motion vector predictor of a current available neighboring block, and wherein the adding the obtained motion vector predictors to the motion vector list while comparing the at least a pair of the motion vector predictors of the available neighboring blocks to exclude the one of the pair of the motion vector predictors of the available neighboring blocks from the motion vector list when the pair of the motion vector predictors are the same comprises:
  determining whether the motion vector predictor of the current available neighboring block is the same as motion vector predictors that have been added to the motion vector list; and
  adding the motion vector predictor of the current available neighboring block to the motion vector list when the motion vector predictor of the current available neighboring block is not the same as motion vector predictors that have been added to the motion vector list.

9. The method for building a motion vector list for motion vector prediction according to claim 5, wherein the obtained motion vector predictor is a motion vector predictor of a current available neighboring block, and wherein the adding the obtained motion vector predictors to the motion vector list while comparing the at least a pair of the motion vector predictors of the available neighboring blocks to exclude the one of the pair of the motion vector predictors of the available neighboring blocks from the motion vector list when the pair of the motion vector predictors are the same comprises:
  determining whether the motion vector predictor of the current available neighboring block is the same as motion vector predictors that have been added to the motion vector list; and
  adding the motion vector predictor of the current available neighboring block to the motion vector list when the motion vector predictor of the current available neighboring block is not the same as motion vector predictors that have been added to the motion vector list.

10. The method for building a motion vector list for motion vector prediction according to claim 6, wherein determining whether the motion vector predictor of the current available neighboring block is the same as motion vector predictors of other available neighboring blocks that are not the current available neighboring block comprises;
  determining whether the motion vector predictor of the fourth neighboring block is the same as a motion vector predictor of the second neighboring block when the current available neighboring block is the fourth neighboring block;
  determining whether the motion vector predictor of the third neighboring block is the same as the motion vector predictor of the fourth neighboring block when the current available neighboring block is the third neighboring block;
  determining whether the motion vector predictor of the first neighboring block is the same as the motion vector predictor of the second neighboring block when the current available neighboring block is the first neighboring block; and
  determining whether the motion vector predictor of the fifth neighboring block is the same as at least one of the motion vector predictor of the second neighboring block and the motion vector predictor of the fourth neighboring block when that the current available neighboring block is the fifth neighboring block.

11. The method for building a motion vector list for motion vector prediction according to claim 7, wherein determining whether the motion vector predictor of the current available neighboring block is the same as motion vector predictors of other available neighboring blocks that are not the current available neighboring block comprises:
  determining whether the motion vector predictor of the fourth neighboring block is the same as a motion vector predictor of the second neighboring block when the current available neighboring block is the fourth neighboring block;
  determining whether the motion vector predictor of the third neighboring block is the same as the motion vector predictor of the fourth neighboring block when the current available neighboring block is the third neighboring block;
  determining whether the motion vector predictor of the first neighboring block is the same as the motion vector predictor of the second neighboring block when the current available neighboring block is the first neighboring block; and
  determining whether the motion vector predictor of the fifth neighboring block is the same as at least one of the motion vector predictor of the second neighboring block and the motion vector predictor of the fourth neighboring block when the current available neighboring block is the fifth neighboring block.

12. The method for building a motion vector list for motion vector prediction according to claim 8, wherein determining whether the motion vector predictor of the current available neighboring block is the same as the motion vector predictors that have been added to the motion vector list comprises:

determining whether the motion vector predictor of the fourth neighboring block is the same as a motion vector predictor of the second neighboring block that has been added to the motion vector list when the current available neighboring block is the fourth neighboring block;

determining whether the motion vector predictor of the third neighboring block is the same as the motion vector predictor of the fourth neighboring block that has been added to the motion vector list when the current available neighboring block is the third neighboring block;

determining whether the motion vector predictor of the first neighboring block is the same as the motion vector predictor of the second neighboring block that has been added to the motion vector list when the current available neighboring block is the first neighboring block; and determining whether the motion vector predictor of the fifth neighboring block is the same as at least one of the motion vector predictor of the second neighboring block that has been added to the motion vector list and the motion vector predictor of the fourth neighboring block that has been added to the motion vector list when the current available neighboring block is the fifth neighboring block.

13. The method for building a motion vector list for motion vector prediction according to claim 9, wherein determining whether the motion vector predictor of the current available neighboring block is the same as the motion vector predictors that have been added to the motion vector list comprises:

determining whether the motion vector predictor of the fourth neighboring block is the same as a motion vector predictor of the second neighboring block that has been added to the motion vector list when the current available neighboring block is the fourth neighboring block;

determining whether the motion vector predictor of the third neighboring block is the same as the motion vector predictor of the fourth neighboring block that has been added to the motion vector list when the current available neighboring block is the third neighboring block;

determining whether the motion vector predictor of the first neighboring block is the same as the motion vector predictor of the second neighboring block that has been added to the motion vector list when the current available neighboring block is the first neighboring block; and determining whether the motion vector predictor of the fifth neighboring block is the same as at least one of the motion vector predictor of the second neighboring block that has been added to the motion vector list and the motion vector predictor of the fourth neighboring block that has been added to the motion vector list when the current available neighboring block is the fifth neighboring block.

14. An apparatus for building a motion vector list for motion vector prediction, comprising:

a receiver configured to obtain spatial neighboring blocks of a current prediction block using the predefined position relationship between the spatial neighboring blocks and the current prediction blocks, wherein the current prediction block to be predicated using the motion vector list is located inside a current coding unit; and a processor programmed to:
determine available neighboring blocks of the current prediction block according to a partition manner of the current coding unit when one of the spatial neighboring blocks of the current prediction block is located inside the current coding unit, wherein the available neighboring blocks are located outside the current coding unit;

obtain motion vector predictors from the available neighboring blocks in a preset sequence according to motion vector predictors of the available neighboring blocks; and add the obtained motion vector predictors to the motion vector list while comparing at least a pair of the motion vector predictors of the available neighboring blocks to exclude one of the pair of the motion vector predictors of the available neighboring blocks from the motion vector list when the pair of the motion vector predictors are the same, wherein the at least a pair of motion vector predictors belong to two available neighboring blocks which are located on the same side of the current prediction block.

15. The apparatus for building a motion vector list for motion vector prediction according to claim 14, wherein the spatial neighboring blocks of the prediction block obtained by the receiver comprise a first neighboring block located at a bottom-left side of the prediction block, a second neighboring block located at a left side of the prediction block, a third neighboring block located at a top-right side of the prediction block, a fourth neighboring block located at a top side of the prediction block, and a fifth neighboring block located at a top-left side of the prediction block.

16. The apparatus for building a motion vector list for motion vector prediction according to claim 15, either wherein the current coding unit is partitioned into a first prediction block and a second prediction block on top and bottom sides, wherein the current prediction block is the second prediction block, and wherein the available neighboring blocks of the prediction block comprise the first neighboring block, the second neighboring block, the third neighboring block, and the fifth neighboring block of the second prediction block; or wherein the current coding unit is partitioned into a first prediction block and a second prediction block on left and right sides, wherein the current prediction block is the second prediction block, and wherein the available neighboring blocks of the prediction block comprise the first neighboring block, the third neighboring block, the fourth neighboring block, and the fifth neighboring block of the second prediction block.

17. The apparatus for building a motion vector list for motion vector prediction according to claim 15, wherein the available neighboring blocks are interframe coding blocks, and wherein the processor is further configured to obtain the motion vector predictors from the available neighboring blocks in a sequence of the second neighboring block, the fourth neighboring block, the third neighboring block, the first neighboring block, and the fifth neighboring block.

18. The apparatus for building a motion vector list for motion vector prediction according to claim 16, wherein the available neighboring blocks are interframe coding blocks, and wherein the processor is further configured to obtain the motion vector predictors from the available neighboring blocks in a sequence of the second neighboring block, the fourth neighboring block, the third neighboring block, the first neighboring block, and the fifth neighboring block.

19. The apparatus for building a motion vector list for motion vector prediction according to claim 17, wherein the processor is further configured to:
 determine whether a motion rector predictor of a current available neighboring block is the same as motion vector predictors of other available neighboring blocks that are not the current available neighboring block when the obtained motion vector predictor is a motion vector predictor of a current available neighboring block; and
 add the motion vector predictor of the current available neighboring block to the motion vector list when the motion vector predictor of the current available neighboring block is not the same as motion vector predictors of other available neighboring blocks that are not the current available neighboring block.

20. The apparatus for building a motion vector list for motion vector prediction according to claim 18, wherein the processor is further configured to:
 determine whether a motion vector predictor of a current available neighboring block is the same as motion vector predictors of other available neighboring blocks that are not the current available neighboring block when the obtained motion vector predictor is a motion vector predictor of a current available neighboring block; and
 add the motion vector predictor of the current available neighboring block to the motion vector list when the motion vector predictor of a current available neighboring block is not the same as motion vector predictors of other available neighboring blocks that are not the current available neighboring block.

21. The apparatus for building a motion vector list for motion vector prediction according to claim 17, wherein the processor is further configured to:
 determine whether a motion vector predictor of a current available neighboring block is the same as motion vector predictors that have been added to the motion vector list when the obtained motion vector predictor is a motion vector predictor of a current available neighboring block; and
 add the motion vector predictor of the current available neighboring block to the motion vector list when the motion vector predictor of the current available neighboring block is not the same as motion vector predictors that have been added to the motion vector list.

22. The apparatus for building a motion vector list for motion vector prediction according to claim 18, wherein the processor is further configured to;
 determine whether a motion vector predictor of a current available neighboring block is the same as motion vector predictors that have been added to the motion vector list when the obtained motion vector predictor is the motion vector predictor of a current available neighboring block; and
 add the motion vector predictor of the current available neighboring block to the motion vector list when the motion vector predictor of the current available neighboring block is not the same as motion vector predictors that have been added to the motion vector list.

23. The apparatus for building a motion vector list for motion vector prediction according to claim 19, wherein the current available neighboring block is the fourth neighboring block, and wherein when the processor is configured to determine whether the motion vector predictor of the fourth neighboring block is the same as the motion vector predictor of the second neighboring block, the processor is configured to:
 determine whether a motion vector predictor of the third neighboring block is the same as the motion vector predictor of the fourth neighboring block when the current available neighboring block is the third neighboring block;
 determine whether a motion vector predictor of the first neighboring block is the same as the motion vector predictor of the second neighboring block when the current available neighboring block is the first neighboring block; and
 determine whether a motion vector predictor of the fifth neighboring block is the same as at least one of the motion vector predictor of the second neighboring block and the motion vector predictor of the fourth neighboring block when the current available neighboring block is the fifth neighboring block.

24. The apparatus for building a motion vector list for motion vector prediction according to claim 20, wherein the current available neighboring block is the fourth neighboring block, and wherein when the processor is configured to determine whether the motion vector predictor of the fourth neighboring block is the same as the motion vector predictor of the second neighboring block, the processor is configured to:
 determine whether a motion vector predictor of the third neighboring block is the same as the motion vector predictor of the fourth neighboring block when the current available neighboring block is the third neighboring block;
 determine whether a motion vector predictor of the first neighboring block is the same as the motion vector predictor of the second neighboring block when the current available neighboring block is the first neighboring block; and
 determine whether a motion vector predictor of the fifth neighboring block is the same as at least one of the motion vector predictor of the second neighboring block and the motion vector predictor of the fourth neighboring block when the current available neighboring block is the fifth neighboring block.

25. The apparatus for building a motion vector list for motion vector prediction according to claim 21, wherein the current available neighboring block is the fourth neighboring block, and wherein when the processor is configured to determine whether the motion vector predictor of the fourth neighboring block is the same as the motion vector predictor of the second neighboring block that has been added to the motion vector list, the processor is configured to:
 determine whether a motion vector predictor of the third neighboring block is the same as the motion vector predictor of the fourth neighboring block that has been added to the motion vector list when the current available neighboring block is the third neighboring block;
 determine whether a motion vector predictor of the first neighboring block is the same as the motion vector predictor of the second neighboring block that has been added to the motion vector list when the current available neighboring block is the first neighboring block; and
 determine whether a motion vector predictor of the fifth neighboring block is the same as at least one of the motion vector predictor of the second neighboring block that has been added to the motion vector list and the motion vector predictor of the fourth neighboring block that has been added to the motion vector list when the current available neighboring block is the fifth neighboring block.

26. The apparatus for building a motion vector list for motion vector prediction according to claim 22, wherein the current available neighboring block is the fourth neighboring block, and wherein when the processor is configured to determine whether the motion vector predictor of the fourth neighboring block is the same as the motion vector predictor of the second neighboring block that has been added to the motion vector list, the processor is configured to:
   determine whether a motion vector predictor of the third neighboring block is the same as the motion vector predictor of the fourth neighboring block that has been added to the motion vector list when the current available neighboring block is the third neighboring block;
   determine whether a motion vector predictor of the first neighboring block is the same as the motion vector predictor of the second neighboring block that has been added to the motion vector list when the current available neighboring block is the first neighboring block; and
   determine whether a motion vector predictor of the fifth neighboring block is the same as at least one of the motion vector predictor of the second neighboring block that has been added to the motion vector list and the motion vector predictor of the fourth neighboring block that has been added to the motion vector list when the current available neighboring block is the fifth neighboring block.

27. A method for building, by a hardware, a motion vector list for motion vector prediction, comprising:
   obtaining spatial neighboring blocks of a current prediction block, wherein the current prediction block to be predicated using the motion vector list is located inside a current coding unit, wherein the spatial neighboring blocks of the prediction block comprise a first neighboring block located at a bottom-left side of the prediction block, a second neighboring block located at a left side of the prediction block, a third neighboring block located at a top-right side of the prediction block, a fourth neighboring block located at a top side of the prediction block, and a fifth neighboring block located at a top-left side of the prediction block;
   determining available neighboring blocks of the current prediction block according to a partition manner of the current coding unit, wherein the available neighboring blocks are located outside the current coding unit, and either wherein the current coding unit is partitioned into a first prediction block and a second prediction block on top and bottom sides, wherein the current prediction block is the second prediction block, and wherein the available neighboring blocks of the prediction block comprise the first neighboring block, the second neighboring block, the third neighboring block, and the fifth neighboring block of the second prediction block, or wherein the current coding unit is partitioned into a first prediction block and a second prediction block on left and right sides, wherein the current prediction block is the second prediction block, and wherein the available neighboring blocks of the prediction block comprise the first neighboring block, the third neighboring block, the fourth neighboring block, and the fifth neighboring block of the second prediction block;
   obtaining a plurality of motion vector predictors from the available neighboring blocks in a preset sequence according to the motion vector predictors of the available neighboring blocks,
   when the current coding unit is partitioned into a first prediction block and a second prediction block on left and right sides and when the current prediction block is the second prediction block:
      adding the motion vector predictor of the fourth neighboring block to the motion vector list when the current neighboring block is the fourth neighboring block and only when the fourth neighboring block includes a motion vector predictor;
      adding the motion vector predictor of the third neighboring block to the motion vector list when the current neighboring block is the third neighboring block, only when the third neighboring block includes a motion vector predictor, and when the prediction value is different from the motion vector predictor of the fourth neighboring block that has been added to the motion vector list;
      adding the motion vector predictor of the first neighboring block to the motion vector list when the current neighboring block is the first neighboring block and only when the first neighboring block includes a motion vector predictor;
      adding the motion vector predictor of the fifth neighboring block to the motion vector list when the current neighboring block is the fifth neighboring block, only when the fifth neighboring block includes a motion vector predictor; and
      add the motion vector predictor of the fifth neighboring block to the motion vector list when the predictor is different from the motion vector predictor of the fourth neighboring block that has been added to the motion vector list, or
   when the current coding unit is partitioned into a first prediction block and a second prediction block on top and bottom sides and when the current prediction block is the second prediction block:
      adding the motion vector predictor of the second neighboring block to the motion vector list when the current neighboring block is the second neighboring block and only when the second neighboring block includes a motion vector predictor;
      adding the motion vector predictor of the third neighboring block to the motion vector list when the current neighboring block is the third neighboring block and only when the third neighboring block includes a motion vector predictor,
      adding the motion vector predictor of the first neighboring block to the motion vector list when the current neighboring block is the first neighboring block, only when the first neighboring block includes a motion vector predictor, and when the predictor is different from the motion vector predictor of the second neighboring block that has been added to the motion vector list; and
      adding the motion vector predictor of the fifth neighboring block to the motion vector list when the current neighboring block is the fifth neighboring block, only when the fifth neighboring block includes a motion vector predictor, and when the predictor is different from the motion vector predictor of the second neighboring block that has been added to the motion vector list.

28. A device for building a motion vector list for motion vector prediction, comprising:
- a receiver operated to obtain spatial neighboring blocks of a current prediction block using a predefined position relationship between the spatial neighboring blocks and the current prediction blocks, wherein the current prediction block to be predicated by using the motion vector list is located inside a current coding unit, and the spatial neighboring blocks of the prediction block comprise a first neighboring block located at a bottom-left side of the prediction block, a second neighboring block located at a left side of the prediction block, a third neighboring block located at a top-right side of the prediction block, a fourth neighboring block located at a top side of the prediction block, and a fifth neighboring block located at a top-left side of the prediction block; and
- a processor coupled to the receiver and programmed to:
  - determine available neighboring blocks of the current prediction block according to a partition manner of the current coding unit, wherein the available neighboring blocks are located outside the current coding unit, and either wherein the current coding unit is partitioned into a first prediction block and a second prediction block on top and bottom sides, wherein the current prediction block is the second prediction block, and wherein the available neighboring blocks of the prediction block comprise the first neighboring block, the second neighboring block, the third neighboring block, and the fifth neighboring block of the second prediction block, or wherein the current coding unit is partitioned into a first prediction block and a second prediction block on left and right sides, wherein the current prediction block is the second prediction block, and wherein the available neighboring blocks of the prediction block comprise the first neighboring block, the third neighboring block, the fourth neighboring block, and the fifth neighboring block of the second prediction block; and
  - obtain a plurality of motion vector predictors from the available neighboring blocks in a preset sequence according to the motion vector predictors of the available neighboring blocks;
  - when the current coding unit is partitioned into a first prediction block and a second prediction block on left and right sides and the current prediction block is the second prediction block:
    - add the motion vector predictor of the fourth neighboring block to the motion vector list when the current neighboring block is the fourth neighboring block and only when the fourth neighboring block includes a motion vector predictor;
    - add the motion vector predictor of the third neighboring block to the motion vector list when the current neighboring block is the third neighboring block, only hen the third neighboring block includes a motion vector predictor, and when the prediction value is different from the motion vector predictor of the fourth neighboring block that has been added to the motion vector list;
    - add the motion vector predictor of the first neighboring block to the motion vector list when the current neighboring block is the first neighboring block and only when the first neighboring block includes a motion vector predictor;
    - add the motion vector predictor of the fifth neighboring block to the motion vector list when the current neighboring block is the fifth neighboring block, only when the fifth neighboring block includes a motion vector predictor; and
    - add the motion vector predictor of the fifth neighboring block to the motion vector list when the predictor is different from the motion vector predictor of the fourth neighboring block that has been added to the motion vector list; or
  - when the current coding unit is partitioned into a first prediction block and a second prediction block on top and bottom sides and when the current prediction block is the second prediction block:
    - add the motion vector predictor of the second neighboring block to the motion vector list when the current neighboring block is the second neighboring block and only when the second neighboring block includes a motion vector predictor;
    - add the motion vector predictor of the third neighboring block to the motion vector list when the current neighboring block is the third neighboring block and only when the third neighboring block includes a motion vector predictor,
    - add the motion vector predictor of the first neighboring block to the motion vector list when the current neighboring block is the first neighboring block, only when the first neighboring block includes a motion vector predictor, and when the predictor is different from the motion vector predictor of the second neighboring block that has been added to the motion vector list; and
    - add the motion vector predictor of the fifth neighboring block to the motion vector list when the current neighboring block is the fifth neighboring block, only when the fifth neighboring block includes a motion vector predictor, and when the predictor is different from the motion vector predictor of the second neighboring block that has been added to the motion vector list.

* * * * *